Figure 1:
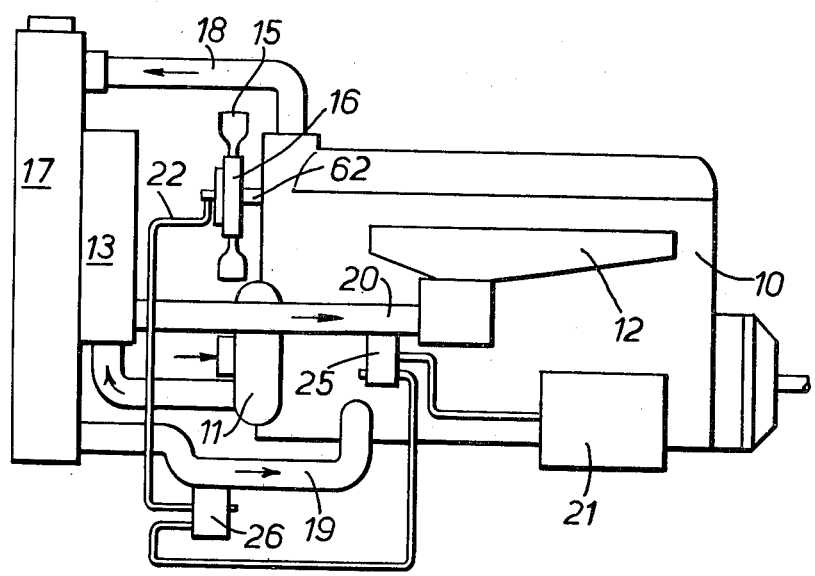

United States Patent [19]

Elmer

[11] 4,176,630
[45] Dec. 4, 1979

[54] AUTOMATIC CONTROL VALVES
[75] Inventor: Arthur E. H. Elmer, Stroud, England
[73] Assignee: Dynair Limited, Gloucestershire, England
[21] Appl. No.: 802,496
[22] Filed: Jun. 1, 1977
[51] Int. Cl.² .............................................. F01P 7/12
[52] U.S. Cl. .............................. 123/41.12; 123/41.49; 192/82 T; 236/35
[58] Field of Search ............... 123/41.12, 41.05, 41.46, 123/41.49, 41.63, 119 CD, 41.31, 41.11, 41.48; 192/82 T; 60/599; 236/DIG. 2, 35, 86

[56] References Cited

U.S. PATENT DOCUMENTS

| 2,125,889 | 8/1938 | Crump | 236/86 |
| 2,231,292 | 2/1941 | Neugebauer | 236/86 |
| 2,452,007 | 10/1948 | Weybrew | 236/35 |
| 3,203,499 | 8/1965 | Bentz | 123/41.31 |
| 3,388,694 | 6/1968 | Elmer | 123/41.12 |
| 3,684,397 | 8/1972 | Elmer | 123/41.12 |
| 3,872,842 | 3/1975 | Medley | 123/41.12 |
| 3,902,663 | 9/1975 | Elmer | 123/41.12 |
| 3,961,606 | 6/1976 | Wong | 123/41.12 |
| 4,062,188 | 12/1977 | Cutler | 60/599 |

FOREIGN PATENT DOCUMENTS 2237979  2/1974  Fed. Rep. of Germany ............. 236/35
785143 10/1957  United Kingdom ................... 123/41.12

Primary Examiner—Charles J. Myhre
Assistant Examiner—Jeffrey L. Yates
Attorney, Agent, or Firm—Young & Thompson

[57] ABSTRACT

The invention provides a pneumatic control system for a pneumatically operated clutch in the drive to a cooling fan of a vehicle engine. There are two thermostat valves arranged in series in the pneumatic control line. One valve is positioned in the supercharged air passage and the other valve is in the liquid coolant passage. If the temperature at either valve becomes excessive the supply line 22 is connected to relief and the fan clutch automatically engages.

6 Claims, 8 Drawing Figures

AUTOMATIC CONTROL VALVES

This invention relates to automatic fluid control valves and control systems as used to control the supply of a pressure fluid to a fluid actuator such as a pneumatic piston, diaphragm, or ram. The invention is applicable both to positive pressure supplies and also negative (i.e. suction) or variable supplies and the term "pressure" as used herein in its broad context is intended to include both positive and negative or sub-atmospheric pressures.

The invention may be applied to automatic control valves for sensing various different quantities, but is particularly applicable to automatic thermal control valves and more particularly to thermostatic control systems for cooling fan drives in vehicle engines.

It is known that the cooling requirements of a vehicle engine vary considerably according to the operating conditions and great advantages and economies can be achieved by varying or interrupting the fan drive. This can be obtained by an automatic device for sensing cooling water temperature, or a device which senses air temperature, and one of the objects of the present invention is to provide a fluid control system which is sensitive both to water and air temperatures.

Broadly stated the invention consists in apparatus for controlling the flow of a pressure fluid to a fluid actuator, including a pair of automatic control valves connected between a source of pressure fluid and the actuator, each valve having two operative positions in one of which the valve connects an inlet port to an outlet port while in the other position it closes the connection between the inlet and outlet ports and connects the outlet port to a relief passage, the arrangement being such that when either valve is in its second position the pressure line leading to the actuator is disconnected from the pressure supply and connected to relief.

Conveniently the two valves are arranged in series in a common pressure supply line, and at least one of the valves includes an automatic pressure sensing system arranged to move the valve into its second operative position if the pressure in the inlet to the valve falls below a pre-selected value.

As has been explained the apparatus is of particular utility in combination with a cooling fan drive for a vehicle engine, the actuator being arranged to engage and disengage a clutch or variable speed drive to the fan.

In a vehicle engine cooling fan drive it is undesirable that the drive to the fan should be interrupted if there is a failure in the pressure system. Accordingly it is preferred that the fan drive should be of the fail-safe variety, that is to say engaged by a resilient device and disengaged by the pneumatic actuator. Preferred forms of valve for use with such a system are arranged to vent the output port from the valve to relief in one position of the valve, to ensure that the resilient springs can effectively engage the clutch. This introduces a problem but also facilitates an effective solution, and according to a preferred feature of the invention the actuator is a pneumatic ram arranged to cause disengagement of a clutch, and includes a resilient device to cause engagement of the clutch.

The invention may be performed in various ways and two embodiments of the invention with some possible modifications will now be described by way of example with reference to the accompanying drawings, in which:

FIG. 1 is a diagrammatic side elevation of a vehicle engine incorporating a cooling fan control system according to the invention.

Figure 2:
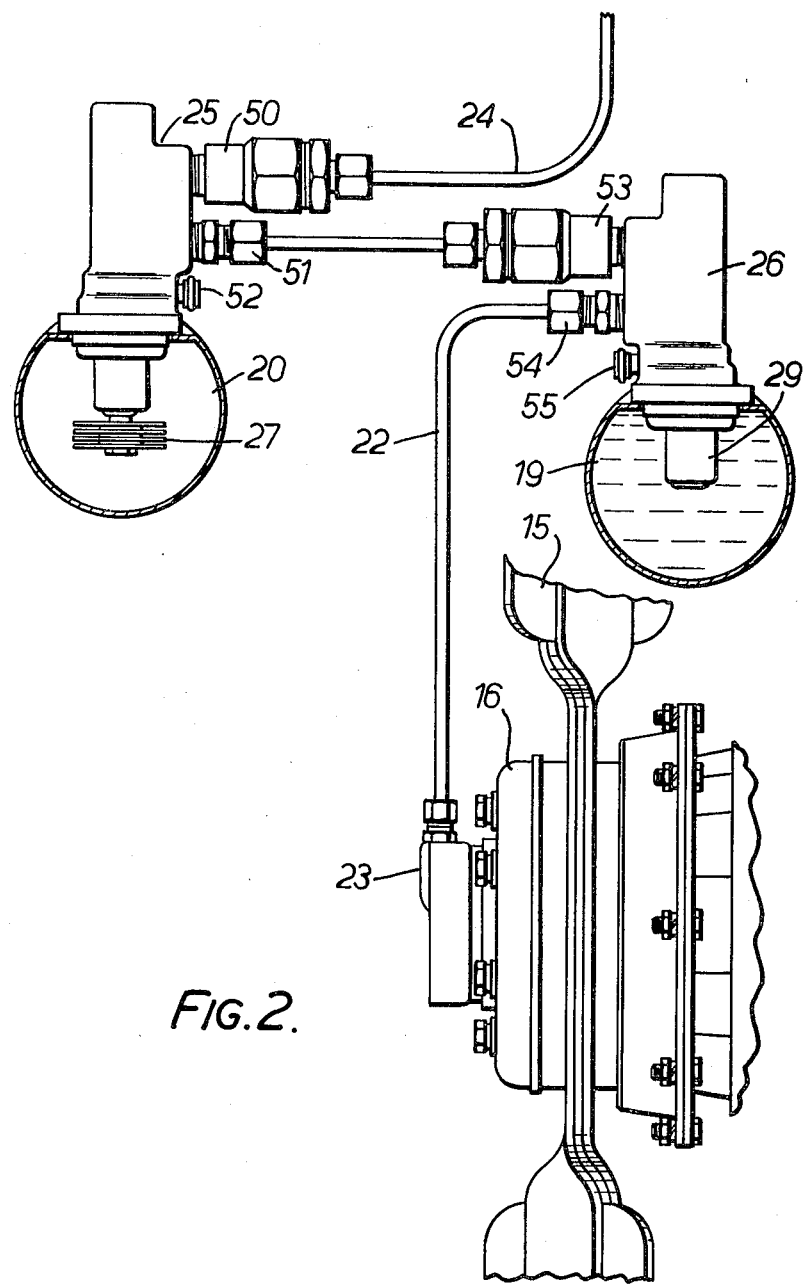
Figure 3:
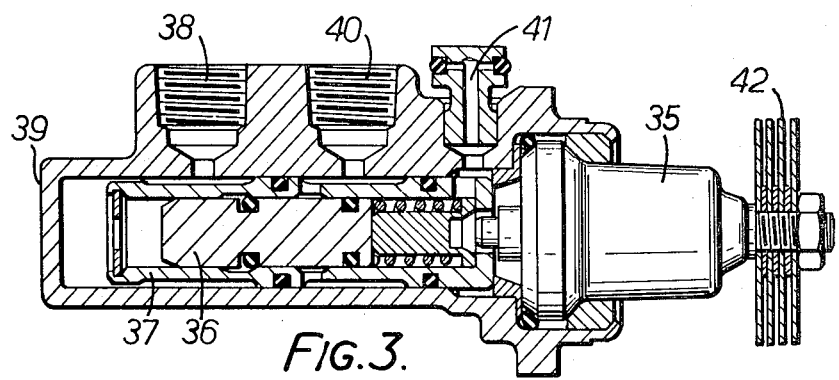
Figure 4:
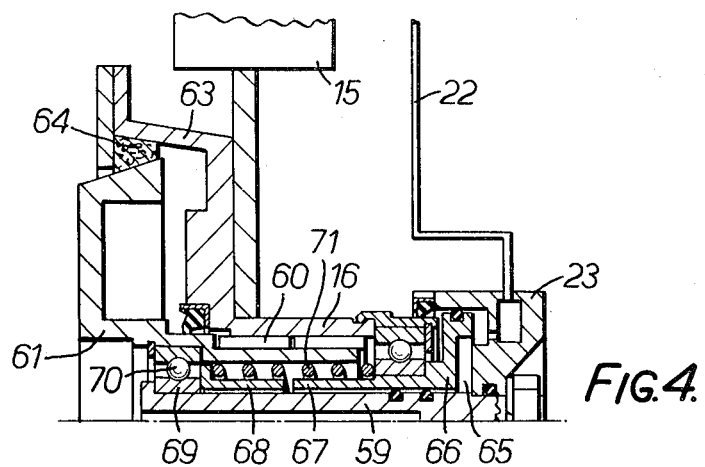
Figure 5:
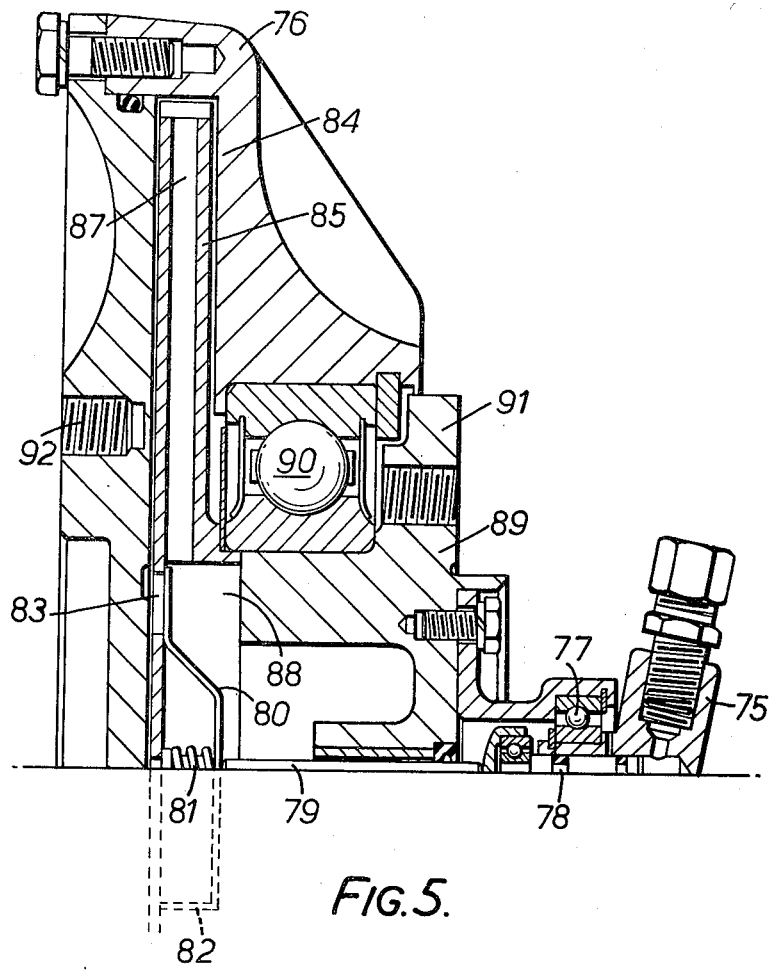
Figure 6:
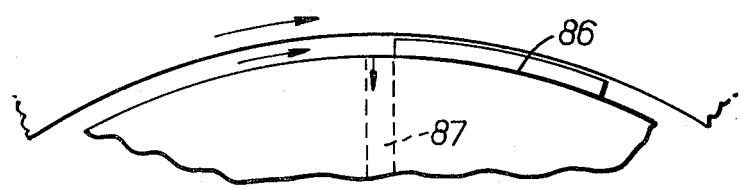
Figure 7:
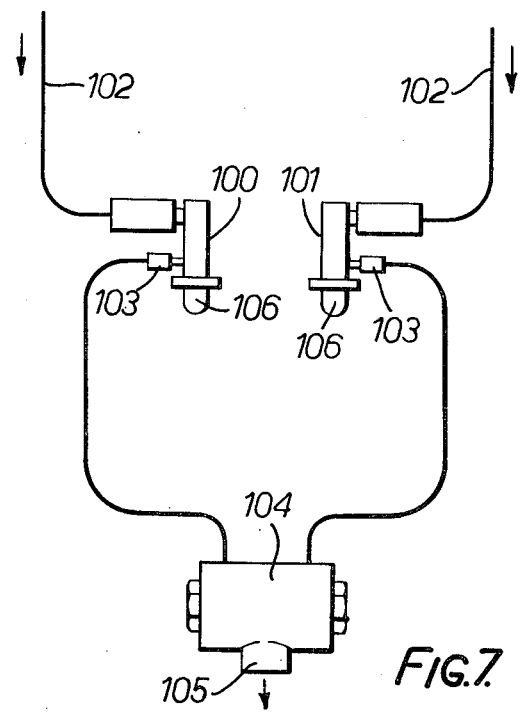
Figure 8:
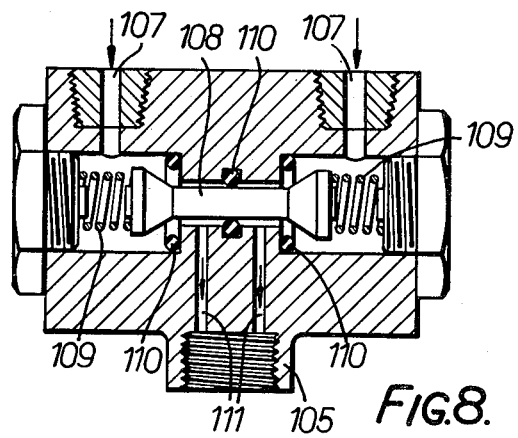

FIG. 2 is a general schematic illustration of the fluid control system of FIG. 1, FIG. 3 is a sectional elevation through one type of thermostat control valve which may be used in the control system, FIG. 4 is a half-section through one form of pneumatically operated friction clutch, suitable for use with the invention, FIG. 5 is a sectional side elevation through another form of viscous fluid variable speed drive for a cooling fan, which may be used in the invention, FIG. 6 is a detail end view of the upper part of FIG. 5, FIG. 7 is a diagrammatic illustration of another parallel flow control system for interconnecting two valves in a control circuit according to the invention, and FIG. 8 is a sectional view on an enlarged scale through the change-over poppet valve of FIG. 7.

The embodiment illustrated in FIGS. 1, 2 and 3 forms a thermally actuated control system for a cooling fan 15 on a vehicle engine 10, including a friction clutch and a pneumatic actuator within the fan hub 16. This particular example is applied to an internal combustion engine 10 fitted with a turbo-charger 11 for compressing the air supplied to the engine inlet manifold 12, and an air cooler 13 in the super-charged air passage 20 for cooling the air after it has been heated by compression in the turbo-charger. The normal liquid coolant circuit of the engine includes a radiator 17, with supply and return connections 18,19 to the cooling passages in the cylinder block. In such a system it is of advantage to control the engagement and disengagement of the fan clutch in the hub 16 in response to the sensed temperature both of the cooling water of the engine and of the air temperature in the super-charger duct 20 downstream of the air cooler 13. It will be understood that the cooling fan 15 is arranged not only to supply cooling air to the normal radiator 17 of the coolant circuit, but also to the cooler 13 for cooling the super-charged air.

In the control system illustrated in FIG. 2, the cooling fan blades 15 are mounted on the rotary fan hub 16 which includes an internal pneumatic ram and friction clutch connecting the hub to the input shaft drive from the engine. Details are shown in FIG. 4. Compressed air to acutate this ram is supplied to the fan hub through a flexible pressure line 22 connected to a static non-rotating rotary seal 23 at the forward free end of the fan hub. Compressed air to actuate the clutch is supplied from a source of compressed air on the vehicle such as an air pump and pressure container 21 via a pressure line 24 which is connected in series to a first thermal control valve 25 and a second similar control valve 26. The valve 25 has a sensing element 27 located in the supercharge air passage 20 and the second valve 26 has a sensing element 29 in the water passage 19 which is the return flow passage from the normal engine coolant radiator 17.

Each of the valves is as shown in detail in FIG. 3. Essentially it includes a thermal sensing element in the form of a wax capsule 35 acting on a movable valve spool 36 located within a movable valve sleeve 37. The inlet port 38 is adjacent the closed end 39 of the valve housing. The outlet or service line 40 is at an intermediate point, and adjacent the capsule there is a third vent port 41.

Each valve is so designed and arranged that if the capsule 35 expands to move the spool 36 to the left at a higher temperature, the inlet 38 is disconnected from the outlet 40 and the outlet is connected to the vent 41. The same result also follows automatically if the pressure in the inlet line 38 falls below a predetermined value in which case the pressure at the left-hand closed end of the valve housing falls and the valve moves automatically into its shut off position. To increase the sensitivity of the valve a series of heat conducting copper discs 42 may be attached to the end of the wax capsule.

In the system illustrated in FIG. 2, it will be seen that the inlet 50 of the valve 25 will be disconnected from the outlet if the super-charged air temperature in duct 20 rises above a preselected value. The outlet 51 is then connected to relief 52 and it follows that the pressure in the inlet 53 of the second valve 26 will fall to atmospheric pressure. The second valve will then automatically move into its closed position regardless of the sensed temperature of the cooling water in the passage 19. The outlet 54 is thus connected to relief 55 so ensuring that no pressure is exerted on the internal ram in the fan hub 16. The friction clutch within the hub thus engages automatically by means of the fail-safe internal springs, thus ensuring that the cooling fan 15 is driven.

If the water temperature sensed by the valve 26 rises above a preselected value this valve will automatically shift into its closed position and the same result will occur. Thus the fan clutch in hub 16 will be engaged if either the sensed water or air temperature exceeds the selected limit.

Particulars of one form of friction clutch for a fan drive of the type illustrated in this embodiment are illustrated in the accompanying FIG. 4. As illustrated, the fan blades 15 are mounted on the rotating hollow hub 16 which is supported via needle roller bearings 60 from a part 61 which is bolted to a drive shaft 62 (see FIG. 1). The hub 16 is secured to a friction clutch output member 63 and a tapered friction clutch ring 64 is interposed between this member and the driving part 61. The clutch can be engaged and disengaged by relative axial movement of the hub 16. This is achieved by a pneumatic piston actuator which includes a non-rotating fluid seal or cylinder element 23 rigidly secured to a central stem 59. Attached to the element 23 is the flexible compressed air line 22 which feeds the compressed air into a chamber 65 formed between the cylinder element 23 and an annular piston element 66 surrounding the stem 59 and connected to a sleeve 67 aligned with a further sleeve 68 engaging the inner race 69 of a thrust bearing 70 interposed between the stem 59 and the part 61 which constitutes the clutch input drive member. A spring 71 acts between the bearing 70 and a further thrust bearing 72 connected between the piston element 66 and the hub 16.

When compressed air is admitted via the pressure line 22 the pressure within the chamber 65 urges the piston 66 away from the cylinder member 23, and this compresses the spring 71 and moves the hub 16 towards the input drive part 61, thus disconnecting the drive at the friction clutch ring 64. If the pressure at the line 22 is shut off, the spring 71 urges the piston 66 away from the input part 61 and acts through the thrust bearing 72 to move the hub 16 and the clutch output member 63 in a direction to engage the friction clutch ring 64.

In the example illustrated in FIGS. 5 and 6, the invention is applied to the control of an engine cooling fan incorporating a viscous fluid clutch or transmission device in place of the friction clutch in the hub 16 of the first example. The viscous fluid drive is engaged and disengaged automatically by a pneumatic control system identical to that illustrated in FIG. 2, and including also a pressure supply line 22. This communicates with a non-rotary fluid sealing device 75 mounted in the front of the fan hub 76 by means of bearings 77. Incorporated in the device is a small pneumatic actuator 78 which engages an operating pin 79 acting on a pivoted valve plate 80 against the action of a spring 81. The valve plate is pivotally mounted at one end 82 and its other end is arranged to open and close a valve port 83 which effectively controls the volume of the viscous fluid within a fluid housing 84. Located within this annular chamber formed by the housing 84 is a circular disc 85 providing a narrow clearance space over each of its opposed faces and around the edge of the disc 85 are provided one or more small abutments 86 (see FIG. 6) which act as fluid "scoops" to urge fluid inwardly via one or more radial passages 87 into the chamber 88 near the rotary axis. From this chamber the fluid can return to the clearance spaces via the valve port 83. The disc 85 is attached to a rotary element 89 mounted in bearings 90 located in the main housing 76, and having an apertured flange 91 to which the fan blades are attached. The housing 76 is attached to the driving shaft 62 for the fan by bolts fixed in threaded holes 92.

In operation, therefore, it will be seen that when pressure is admitted to the sealing element 75 by the automatic thermal control valve system, the pin 79 is moved to the left causing the valve 80 to close the port 83, and fluid entering the central chamber 88 via the passages 87 cannot therefore return, and fluid builds up in the central chamber 88 and progressively empties the outer clearance spaces at 84. The viscous fluid drive thus progressively reduces to a low figure and the fan speed falls accordingly.

If the sensed water or air temperature then rises, the supply of compressed air to the fitting 75 is shut off by the valves 25 or 26. The spring 81 opens the valve port 83, fluid returns to the clearance spaces, the viscous drive is resumed and the fan speed rises.

It will be understood that the twin valve automatic control illustrated can be applied to many other systems other than a cooling fan drive, but is particularly useful in any system having "fail-safe" characteristics with automatic spring actuation.

The twin valve series-connected pneumatic circuit, illustrated in FIG. 2, is particularly simple and convenient. In some applications, however, it may be possible or preferable to arrange valves in a parallel circuit. As illustrated in FIG. 7, for example, a pair of thermal sensing control valves 100, 101 are conncted each to pneumatic air supply lines 102 (which may be a common vehicle air supply system) and the outlets 103 from the two valves are both conncted to a changeover poppet valve 104 whose outlet 105 is, in turn, connected to the pneumaticaly actuated fan clutch.

The two valves 100, 101 are both of the same type illustrated in FIG. 3, and each has a thermal sensing capsule 106, inlet and outlet ports, and a relief port. As shown in FIG. 8 the poppet valve 104 includes inlets 107 at opposite ends, a movable valve spool 108 with enlarged ends, springs 109 providing a self-centring effect and three spaced O-ring seals 110. A pair of outlet passages 111 are provided one on each side of the central O-ring seal. With this arrangement if pressure falls at, say, the left-hand side of the valve spool it will move to the left closing off the right-hand inlet and connecting the left-hand inlet to the outlet port 105. Likewise the opposite occurs if pressure is relieved on the right-hand side of the valve. If either valve 100, 101 is open to pass compressed air, the valve spool 108 will however remain in its central position to allow air to reach the pneumatic clutch actuator.

With this system if either of the valves 100, 101 should move into its vent position the poppet valve spool 108 becomes unbalanced and shuts off the air inlet from the other valve which may still be passing compressed air. Hence no compressed air can reach the fan hub and the clutch is automatically engaged.

I claim:

1. Apparatus for controlling the flow of a pressure fluid to a fluid actuator operatively connected to a variable speed drive in the rotary transmission to a cooling fan for a vehicle motor, including two automatic temperature sensing fluid control valves connected in series between a source of pressure fluid and the said fluid actuator, each valve having two operative positions in one of which the valve connects an inlet port to an outlet port, while in the other position it closes the connection between the inlet and outlet ports and connects the outlet port to a relief passage, the arrangement being such that when either valve is in its second position the pressure line leading to the actuator is disconnected from the pressure supply and connected to relief, and in which each of the two valves is directly exposed to a fluid flow associated with said vehicle motor so as to sense the fluid temperature directly.

2. Apparatus according to claim 1, in which at least one of said valves is arranged to sense the temperature of a cooling fluid for said vehicle motor.

3. Apparatus according to claim 1, in which one of said valves is located in a liquid coolant circuit for said motor and the other valve is located in a supercharger air supply duct to said motor, both said liquid coolant circuit and said supercharger duct having radiators through which air is impelled by said cooling fan, and said valves being located in said circuit and duct at positions downstream of said radiators.

4. Apparatus according to claim 1, in which at least one of said valves includes an automatic pressure sensing system responsive to the fluid pressure at the valve inlet port arranged to move the valve into its second operative position when the pressure in the inlet to the valve falls below a pre-selected value.

5. Apparatus according to claim 1, in combination with a clutch actuated by the actuator.

6. Apparatus according to claim 5, and a rotary body driven in rotation by said clutch when said clutch is engaged.

* * * * *